United States Patent Office 2,721,447
Patented Oct. 25, 1955

2,721,447

TEMPERATURE CONTROL OF OPERATING FLUID IN HYDRAULIC PRESSURE SYSTEMS

Kenneth G. Hancock, Sankey, Warrington, England, assignor to Electro-Hydraulics Limited, Warrington, England, a company of Great Britain Application August 24, 1951, Serial No. 243,448

4 Claims. (Cl. 60—52)

This invention relates to hydraulic pressure systems utilized for effecting operation of one or more devices. The invention will be described with references to such systems when used for operating devices in aircraft, e. g. aircraft undercarriage equipment, although it will be obvious that the invention is not restricted to such application.

In some circumstances, particularly in aircraft, remote control of a device by an hydraulic system provides advantages. Such systems are known to suffer from the disadvantage that at low temperatures, which are encountered particularly by aircraft in flight, the hydraulic fluid jellifies thus rendering the system inoperative at and below a certain temperature, while in the same, or in another, hydraulic system, some parts become overheated, due to their vicinity to heat generating devices, which overheating tends to affect parts of the system, for example rubber seals.

According to the present invention, an hydraulic pressure system includes means by which the temperature of the liquid in at least a part of the system is adapted to be controlled automatically by thermostatic means when any liquid in the system or the surrounding atmosphere reaches a predetermined temperature. The predetermined temperature may either be one approaching the jellifying temperature of the liquid used in the system, or a temperature approaching that at which the liquid may become overheated.

Preferably the hydraulic liquid is circulated through the system by a pump, which is adapted to be actuated by thermostatic means, whereby, when the temperature in or surrounding the system reaches a predetermined amount, the circulation of the liquid through the system is continued until the liquid is sufficiently heated or cooled, as the case may be; in the case where the predetermined temperature is one approaching the jellifying temperature of the liquid, the heat generated by the pump is utilized to heat the liquid which is, by the pump, transmitted throughout a part or all of the system, the pump continuing to operate until the liquid has reached a predetermined higher temperature.

Preferably the hydraulic liquid is circulated through a small orifice or orifices of the labyrinth type located in a jack piston or jack pistons.

Preferably, the pump utilized for temperature control of the hydraulic system is the normal pump used for the operation of the hydraulic remote control system.

It is not necessary, in all cases, to circulate hydraulic liquid through all parts of the system, and relating to aircraft, it may only be necessary, from time to time, to circulate the liquid through part of the system, for example, one time through the undercarriage system and another time through the flap, or any other system, and thermostatic means may be arranged so that only the liquid in that part of the system whose temperature, or the surrounding temperature of which, has dropped or increased, as the case may be, to the predetermined temperature, is circulated.

One hydraulic system with automatically operable heating means incorporated therein, and as applied to an aircraft undercarriage operating system according to this invention is illustrated in the accompanying drawings, in which.

Figure 1:
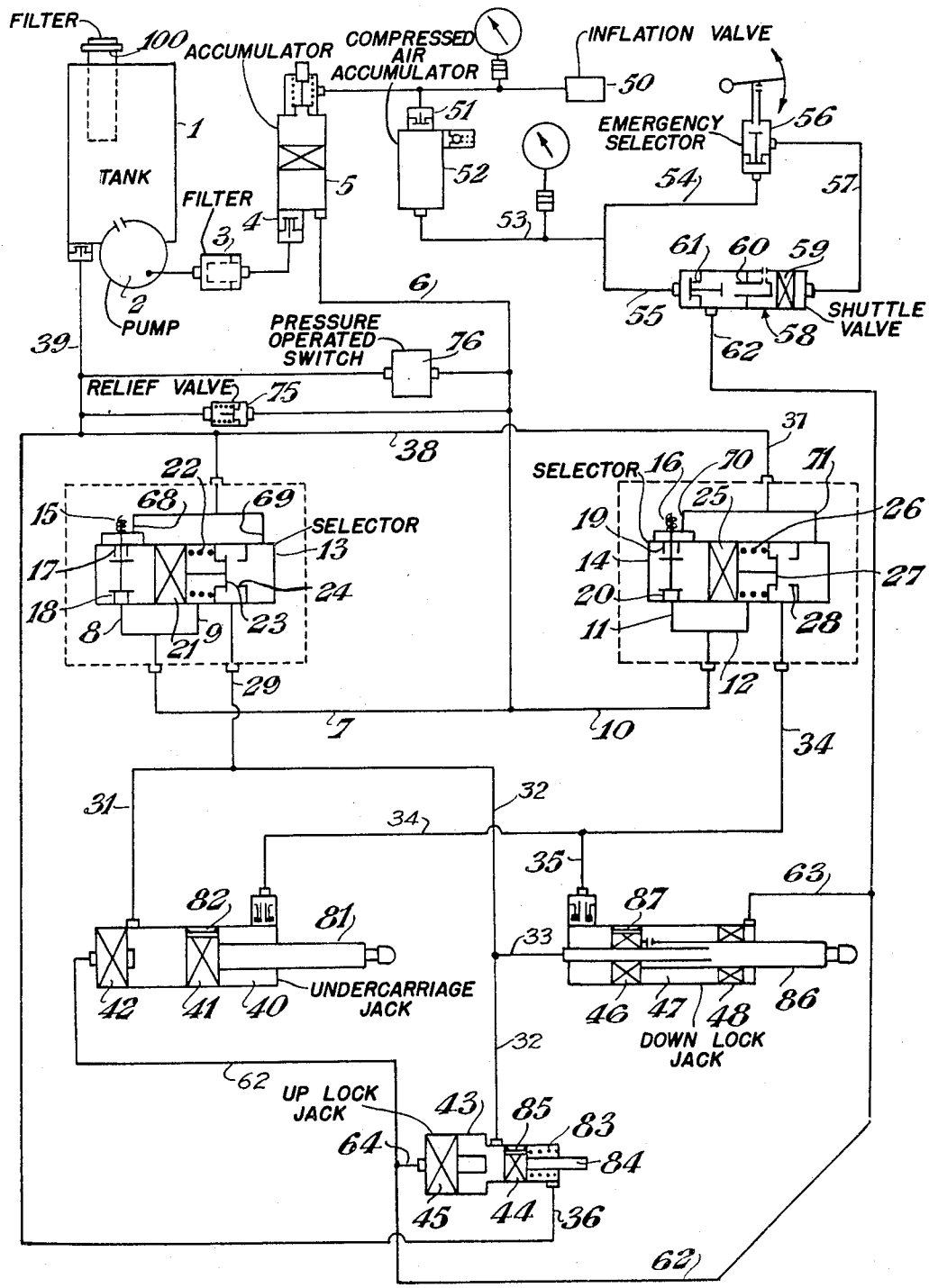
Figure 1 is a schematic diagram of the fluid pressure circuit and apparatus included therein.

In Figure 1 there is shown a system including liquid storage tank 1 which may be heated by the heat generated by a pump 2, said tank being provided with a filter 100. The pump, when operated causes flow of liquid from the tank through a filter 3, non-return valve 4, an hydraulic piston type accumulator 5, pipe lines 6, 7, 8 and 9 into a selector 13, and through pipe lines 6, 7, 10, 11 and 12 into a selector 14. Selectors 13 and 14 are of identical construction, and each selector is adapted to be operated by its electro-magnetic shuttle valve 15 and 16 respectively, the shuttle valves having valve seats 17, 18, 19 and 20 respectively, which are alternatively opened and closed. The selectors 13 and 14 proper, each comprise a piston 21, 25, a spring 22, 26, valves 23 and 27, respectively.

The selector 13 is connected by pipe lines 29 and 31 to an undercarriage jack 40, by pipe lines 29 and 32 to an up lock jack 43, by pipe lines 29 and 33 to a down lock jack 47, and by pipe lines 68, 69, 38 and 39 to the tank 1. The selector 14 is connected by pipe lines 34 and 35 to the down lock jack 47, by pipe line 34 to the main jack 40, and by the pipe lines 70, 71, 37, 38 and 39 to the tank 1. Up lock jack 43 has one side connected to tank 1 by pipe lines 36 and 39.

Between pipe lines 6 and 39 there is interposed a relief valve 75 and a pressure operated switch 76, the latter cutting off the electric current from the electric motor (not shown) driving the pump 2 when a predetermined pressure is reached.

An inflation valve 50 allows for the supply of compressed air into the accumulator 5 and a compressed air accumulator 52, the latter being provided for operation of an emergency system for lowering the undercarriage of the aircraft. From the accumulator 52 air can pass to an emergency selector 56 by pipe lines 53 and 54 and to one side of an automatic shuttle valve 58 by line 55, the other side of the shuttle valve 58 being connected to the emergency selecor 56 by pipe line 57. Shuttle valve 58 is connected by pipe line 62 to the main undercarriage jack 40, by the pipe lines 62 and 64 to the up lock jack 43, and by the pipe lines 62 and 63 to the down lock jack 47.

In the main undercarriage jack 40 slides a piston 41, fixed to a piston rod 81, and a floating piston 42; in the up lock jack 43 slides a piston 44, fixed to a piston rod 84, and a floating piston 45; in the down lock jack 47 slides a piston 46, fixed to a piston rod 86, and a floating piston 48. Pistons 41, 44 and 46 are each provided with small orifices, which may be of the labyrinth type, allowing a small amount of hydraulic fluid to pass from one side of the pistons to the other; these orifices are indicated as 82, 85 and 87 respectively.

The system works as follows:

When it is desired to lower the undercarriage, the pump is actuated and current is supplied to the electro-magnetic relay valve 15 thus closing the valve seat 17 and opening valve seat 18; liquid pressure will now pass from the accumulator 5 through lines 6, 7 and 8 through valve seat 18, act on the piston 21 of the selector 13 against the force of the spring 22, move the valve 23 onto its seat 24, allowing liquid pressure in line 9 to pass through pipe lines 29 and 31, into the jack cylinder 40 and move the piston 41 with its attached piston rod 81 to the right, thus extending the main jack and lowering the undercarriage. At this time, the fluid in the jack cylinder 40 will hold the floating piston 42 in the position shown in Figure 1 so that the inlet from the line 31 into the cylinder 40 will not be covered by the piston 42. Liquid pressure from pipe line 29 will also pass through pipe line 32 into the up lock jack 43, act on the head of the piston 44 to move its piston rod 84 to the right, in Fig. 1 to release the up lock against the load of spring 83. Liquid pressure will also enter through pipe lines 29, 32, and 33 into the down lock jack 47, act on the head end of the piston 46 and connected piston rod 86 to operate the down lock jack to locking position when the undercarriage is lowered. When the undercarriage is locked in its down position the selector 13 will be operated, prior to retraction of the undercarriage to terminate application of pressure on the head end of the up lock jack piston 44, thus enabling the spring 83 to expand and move the piston 44 to the left in Figure 1 and thereby condition the up lock jack 43 for locking the undercarriage in its retracted position when it subsequently is returned to that position. Appropriate means (not shown) are provided to ensure a correct sequence of operation.

When it is desired to retract the undercarriage, electric current is supplied to the electro-magnetic relay valve 16, thus opening its valve seat 20 and closing its valve seat 19; liquid pressure will now pass from pipe lines 6, 10 and 11, through the open valve seat 20, act on the piston 25 of the selector 14, moving it to the right against the action of its spring 26, thus opening its valve 27 and moving it onto its seating 28 so that liquid pressure from line 12 can now pass through the selector, pipe lines 34 and 35 into the down lock jack 47, act on the head end of piston 46 and the piston rod 86 to extend the jack and release the down lock. Liquid pressure will also pass from pipe line 34 into the main jack 40, act on the rod end of the piston 41, retract the piston rod 81 and thus retract the undercarriage.

When the undercarriage reaches the "up" position, the force of the undercarriage jack will overcome the load of the spring 83 in the up lock jack, open this lock and allow the undercarriage to go into the up locked position.

There is also provided a so-called emergency system for lowering the undercarriage by pneumatic pressure from the pneumatic accumulator 52. When it is desired to lower the undercarriage by this means, the stem of a selector 56 is depressed, opening its valve and allowing fluid pressure to pass from accumulator 52 through pipe lines 53 and 54, the said selector 56, pipe line 57, into the right hand side of the automatic control valve 58, act on its piston 59, extend the piston to move a slidable valve seat 60 to the left, thus opening a valve 61 and closing the valve seat 60. Air from the accumulator 52 can now pass through pipe lines 53 and 55, the valve 61, through pipe lines 62 and 64 into the up lock jack 43, act on the floating piston 45, move it to the right and carry the piston 44 with its piston rod 84 also to the right, thus extending the up lock jack and releasing the undercarriage from the up lock. Air under pressure will also pass through pipe line 62 into the main jack 40, act on its floating piston 42, move it to the right and carry its piston 41 with the piston rod 81, extend the jack and lower the undercarriage. Air under pressure will also pass through pipe line 63 into the down lock jack 47, act on its floating piston 48, carry its piston 46 with the piston rod 86 to the left, closing the down lock jack and thus locking the undercarriage in its "down" position. The rightmost position of the piston 48 is shown in Figure 1, with any suitable means limiting the piston's movement to the right to prevent its blocking the inlet from the line 63. For example, lock mechanism, not shown, associated with the piston rod 86 may limit the rightward movement of the rod 86 and hence the piston 48.

The automatic valve 58 will ensure that the system can be operated alternatively by hydraulic or pneumatic pressure and prevent oil leaking through the emergency system to the pressure cabin.

Figure 3:
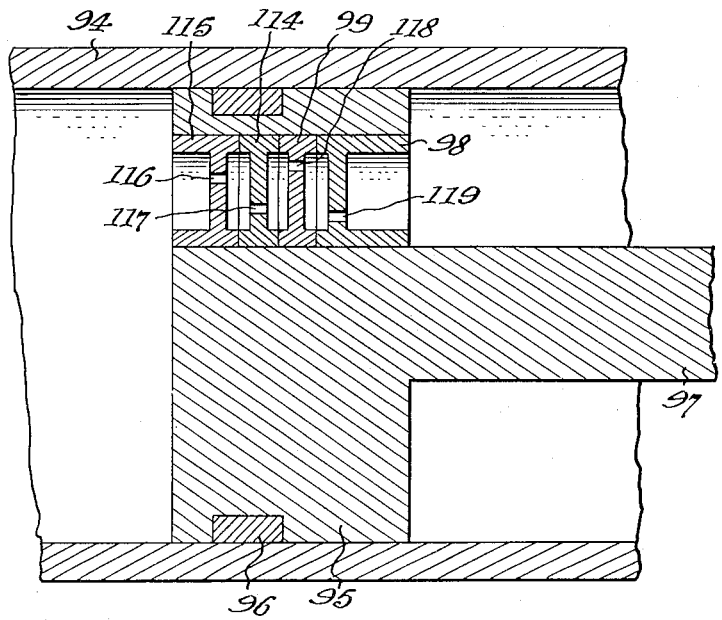
Figure 3 is a fragmentary detail sectional view showing a conventional form of labyrinth type orifice.

A number of thermostatic couplings are provided in or around the hydraulic system, so that when the jellifying temperature of the hydraulic fluid, or any other predetermined temperature is reached, an electric current is actuated which will put the hydraulic system automatically into operation. If an intermittently operated pump is used in the system, the electric motor driving the pump will be actuated by the thermocouple. If a continuously operated pump is used in the system, the electro-magnetic means of the selectors will be put into operation. In both cases, electric relays may be provided to repeat the last preceding operation of the system, e. g. if the last operation was "undercarriage up," the thermostatic means will, via the electric relay, operate the selector for the up position so that the hydraulic fluid will be circulated throughout the system without altering the position of the undercarriage. This circulation will continue through the now opened valve and the small orifices of the jacks, that is, orifices 82, 85, and 87 till the heating up or cooling down through the circulation of the hydraulic fluid reaches a predetermined temperature, and the thermostatic means cuts off the electric current, stops the electric motor driving the pump, or closes the magnetic shuttle valves of the selectors. The orifices 82, 85, and 87 may be of a conventional labyrinth type, shown in Figure 3 as including an arrangement with more than one orifice, and in the jack cylinder 94 of which slides a piston 95 with a piston rod 97 and ring 96 providing a fluid-tight seal. Fixed in the piston 95 are plates 98, 99, 114, 115, each provided with a small orifice 119, 118, 117, 116 respectively, say of .05 inch diameter. These orifices 116 to 119 are so arranged that they do not conform to a straight line and therefore they are of the labyrinth type, which is well known in the art.

Figure 2:
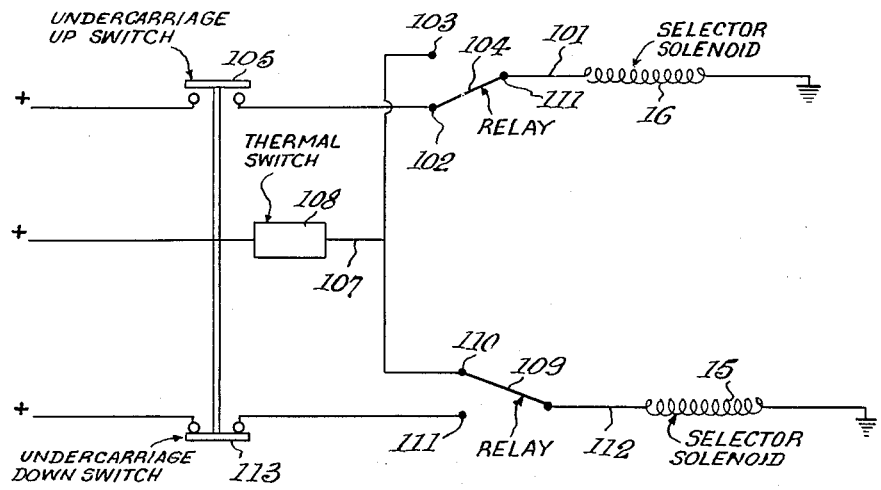
Figure 2 is wiring diagram.

Figure 2 may be considered in connection with Figure 1 with reference to one arrangement of known relays and thermostatic control means. The coil winding 16 of the selector 14 for raising the undercarriage is connected by the lead 101 to the positive terminal of the battery, the relay 104 being interposed, adapted to connect alternately point 102 or 103, while the switch 105 is adapted to be closed by the pilot if he wishes to raise the undercarriage.

The coil winding 15 of the selector 13 for lowering of the undercarriage is connected by the lead 112 to the positive terminal of the battery, the relay 109 being interposed, adapted to connect alternately points 110 and 111, while the switch 113 is adapted to be closed by the pilot if he wishes to lower the undercarriage.

In Figure 2 the circuit is shown with the switch 113 depressed by the pilot to lower the undercarriage. When the pilot depresses the switch, relay 109 rests on point 111 so that the solenoid coil 15 is energized. When the undercarriage is lowered and the down lock jack 47 has locked the undercarriage in this position, the piston rod 86 will move relay 109 from point 111 to point 110. Any known means can be employed. The relay 109 can be conveniently incorporated in the system for indication that the undercarriage is locked in the down position, a well known device.

Points 110 and 103 are jointly connected to the thermal switch 108 by the lead 107 which also connects the thermal switch 108 to the positive lead of the battery. The contacts of the thermal switch 108 make at a preset temperature and break at a preset temperature, so that the pump motor is started, if not already running, the solenoid is energized for the position last selected by the pilot, that is solenoid 15, and the fluid circulated through pipes, valves and jacks to heat or cool the system as may be required.

When the pilot selects undercarriage up by depressing switch 105, switch 113 will be broken and the current will energize solenoid 16. Down lock jack 47 has to release the down lock in order that the undercarriage be raised, and the movement of piston rod 86 will allow relay 109 to move from point 110 to point 111, while at the end of the raising of the undercarriage the up lock jack 44 will lock the undercarriage in the up position and at the same time move relay 104 from point 102 to point 103.

Thermal switch 108 will now energize solenoid 16 and allow fluid to pass through the system if the temperature reaches a predetermined value until the thermal switch is cut off again.

In an aircraft it may be desired to heat the hydraulic fluid during flight only; in this case, the electric relay repeater could be omitted.

It will, of course, be appreciated that according to the setting of the thermocouple, the system can safely be used either to raise and/or lower the temperature of the liquid in the system.

I claim:

1. An hydraulic pressure system apparatus for effecting operation of an aircraft device, said apparatus comprising an hydraulic jack including a cylinder, a piston and piston rod slidable therein, a source of liquid under pressure, a pipe circuit in which is incorporated the jack and a pump, means adapted to automatically bring said pump into operation when the temperature of the liquid reaches a predetermined amount, and at least one orifice means of the labyrinth type formed in said jack piston and comprising more than one orifice, said pump serving to circulate the liquid through the orifice in said piston and through at least part of said circuit when said piston is at the limit of its operating stroke to thereby effect heat transfer to change the temperature of the liquid.

2. An hydraulic pressure system as claimed in claim 1 including solenoid valve means for controlling the circulation of liquid through said orifice and said part of said circuit.

3. An hydraulic pressure system as claimed in claim 1 including control means for enabling said pump to circulate liquid through said orifice and said part of said circuit without operating said piston.

4. An hydraulic pressure system apparatus for effecting operation of an aircraft device, said apparatus comprising an hydraulic jack including a cylinder, a piston and piston rod slidable therein, a source of liquid under pressure, a pipe circuit in which is incorporated the jack and a pump, means adapted to bring said pump automatically into operation when the temperature of the liquid reaches a predetermined amount, and at least one orifice means of the labyrinth type and comprising more than one orifice formed in said jack piston, said pump being operable for delivering liquid under pressure to said cylinder for effecting an operating stroke of said piston and serving to circulate the liquid through the orifice in said piston and through at least part of said circuit when said piston is at the limit of its operating stroke to thereby effect heat transfer to change the temperature of the liquid.

References Cited in the file of this patent

UNITED STATES PATENTS

| | | |
|---|---|---|
| 2,112,466 | Maloon | Mar. 29, 1938 |
| 2,166,940 | Conradson | July 25, 1939 |
| 2,231,292 | Neugebauer | Feb. 11, 1941 |
| 2,233,521 | Ernst et al. | Mar. 4, 1941 |
| 2,297,381 | Wylie | Sept. 29, 1942 |
| 2,343,375 | Herman | Mar. 7, 1944 |
| 2,380,510 | Fitch | July 31, 1945 |
| 2,462,580 | Watson | Feb. 22, 1949 |